United States Patent
Kashiwagi (10) Patent No.: US 6,645,653 B2
(45) Date of Patent: Nov. 11, 2003

(54) FUEL CELL SYSTEM, CONTROLLER THEREOF AND METHOD

(75) Inventor: Naoto Kashiwagi, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 211 days.

(21) Appl. No.: 09/863,354

(22) Filed: May 24, 2001

(65) Prior Publication Data

US 2001/0051290 A1 Dec. 13, 2001

(30) Foreign Application Priority Data

May 30, 2000 (JP) ........................................ 2000-159594

(51) Int. Cl.$^7$ ........................... H01M 8/00; H01M 8/04; H01M 8/12
(52) U.S. Cl. ............................... 429/22; 429/13; 429/23
(58) Field of Search .............................. 429/12, 13, 22, 429/23, 24, 25

(56) References Cited

U.S. PATENT DOCUMENTS

| | | | |
|---|---|---|---|
| 6,249,723 B1 * | 6/2001 | Lutz | 701/22 |
| 6,255,008 B1 * | 7/2001 | Iwase | 429/9 |
| 6,374,166 B1 * | 4/2002 | Takeda | 701/22 |
| 6,378,636 B1 * | 4/2002 | Worrel | 180/65.2 |
| 6,428,444 B1 * | 8/2002 | Tabata | 477/3 |
| 6,447,939 B1 * | 9/2002 | Iwasaki | 429/9 |

FOREIGN PATENT DOCUMENTS

| | | |
|---|---|---|
| EP | 0 948 070 A1 | 10/1999 |
| EP | 0 993 060 A2 | 4/2000 |
| JP | 05-260612 | 10/1993 |
| JP | 09-191506 | 7/1997 |

OTHER PUBLICATIONS

M. Nadal et al., "Development of Hybrid Fuel Cell/Battery Powered Electric Vehicle," *International Journal of Hydrogen Energy*, Elsevier Science Publishers B.V., Barking, GB, vol. 21, No. 6, Jun. 1, 1996, pp. 497–505.

A. Ooyama, "Output Control Device for Fuel Cell Power Generation System," *Patent Abstracts of Japan*, vol. 016, No. 246 (E–1212), Jun. 5, 1992 & JP 04–051466, Feb. 19, 1992.

S. Anzai, "Fuel Cell Power Generation System," *Patent Abstracts of Japan*, vol. 1997, No. 05, May 30, 1997 & JP 09–007618, Jan. 10, 1997.

* cited by examiner

Primary Examiner—Randy Gulakowski
Assistant Examiner—Donald N. Scaltrito
(74) Attorney, Agent, or Firm—Foley & Lardner (57) ABSTRACT

A fuel cell system 10 has a fuel cell 16 and a battery 24. An external load 30 is supplied with output power produced by the fuel cell and output power discharged from the battery. The fuel cell system includes a battery charge level monitoring unit 26 which monitors and detects a battery charge level, an accelerator' displacement sensor 32 which detects an accelerator's displacement value and a control unit 11 which calculates demand power to be produced by the fuel cell and varying rate of the displacement value. The control unit corrects the demand power by using a control map having a power correction pattern that is in response to a varying rate of the displacement value and the charge level of the battery.

20 Claims, 10 Drawing Sheets

NORMAL ACCELERATING STATE

FIG. 7

SLOW-RATE ACCELERATING STATE

FUEL CELL SYSTEM, CONTROLLER THEREOF AND METHOD

BACKGROUND OF THE INVENTION

The present invention relates to a fuel cell system, a controller thereof and a method, and more particularly, to a fuel cell system, a controller thereof and a method for controlling demand power during acceleration in response to a charge level of a battery.

Since a fuel cell system of the type wherein feed material is reformed to produce hydrogen gas necessary for electric power generation relatively has a low response characteristic in production of electric power during a transient condition, a battery of a large capacity is required in order to compensate for variation in demand power.

In a start-up control of such a fuel cell system, it is a usual practice to monitor a charge level of the battery and to vary the flow rate of feed material to be reformed in the combustor in response to the charge level of the battery. In particular, a control process is employed wherein when the charge level of the battery is low, a fuel cell is started in operation to charge the battery. With such a control process, in order to meet rapid-rate variations in demand power needed for acceleration, a vehicle must carry a battery of a large size at high cost.

SUMMARY OF THE INVENTION

In view of the investigation by the present inventor, on the contrary, in order to meet demand power varying at the rapid rate, with the use of a battery of a small size, it has heretofore been thought to immediately infer a driver's will for acceleration from an accelerator pedal's depressed position or a throttle opening and to implement control such that when acceleration at the rapid rate is discriminated, demand power, which is resultantly to be produced by the fuel cell, is increased and when rapid acceleration is discriminated, the demand power is corrected to a further increased level.

In such a fuel cell system, however, since demand power is corrected to an increased level dominantly by a displacement value of the accelerator pedal or degree of the throttle valve, i.e., rapid-rate acceleration and slow-rate acceleration, accelerating at a low charge level of a battery causes a shortage in output power, probably resulting in poor accelerating performance.

Further, in order to augment the poor accelerating performance caused by shortage of power output, although it has been contemplated to control so as to increase the amount of demand power regardless of the battery charge level, the flow rate of hydrogen gas to be supplied to the fuel cell will increase beyond a higher level than necessary, with a resultant increase in the amount of surplus hydrogen gas owing to less consumption in hydrogen gas by the fuel cell. Then owing to combustion of the surplus hydrogen gas, the temperature of the combustor is increased to an excessively high level, causing undesirable effects therein.

It is therefore an object of the present invention to overcome the above situations investigated by the present inventor and to provide a fuel cell system, controller thereof and method for controlling demand power in response to a battery charge level during acceleration.

In the present invention, a fuel cell system is provided with: a fuel cell producing output power; a battery discharging output power; a battery charge level monitoring unit monitoring and detecting a charge level of the battery; an accelerator's displacement sensor detecting an accelerator's displacement value; and a controller calculating demand power to be produced by the fuel cell based on the accelerator's displacement value detected by the accelerator's displacement sensor, calculating an accelerator's displacement value per unit time based on the accelerator's displacement value, and correcting the demand power based on the accelerator's displacement value per unit time and the charge level of the battery detected by the battery charge level monitoring unit.

In other words, a controller of a fuel cell system having a fuel cell producing output power and a battery discharging output power is provided with: means for monitoring and detecting a charge level of the battery; means for detecting an accelerator's displacement value; means for calculating demand power to be produced by the fuel cell based on the accelerator's displacement value; means for calculating an accelerator's displacement value per unit time based on the accelerator's displacement value; and means for correcting the demand power based on the accelerator's displacement value per unit time and the charge level of the battery.

Besides, a method of controlling a fuel cell system, which has a fuel cell producing output power and a battery discharging output power, monitoring and detecting a charge level of the battery; detecting an accelerator's displacement value; calculating demand power to be produced by the fuel cell based on the accelerator's displacement value; calculating an accelerator's displacement value per unit time based on the accelerator's displacement value; and correcting the demand power based on the accelerator's displacement value per unit time and the charge level of the battery.

Other and further features, advantages, and benefits of the present invention will become more apparent from the following description taken in conjunction with the following drawings.

DETAILED DESCRIPTION OF THE PREFERRED EMBODIMENTS

Hereinafter, a fuel cell system, controller thereof and method of the embodiments according to the present invention will be described in detail in reference to the attached drawings.

Figure 1:
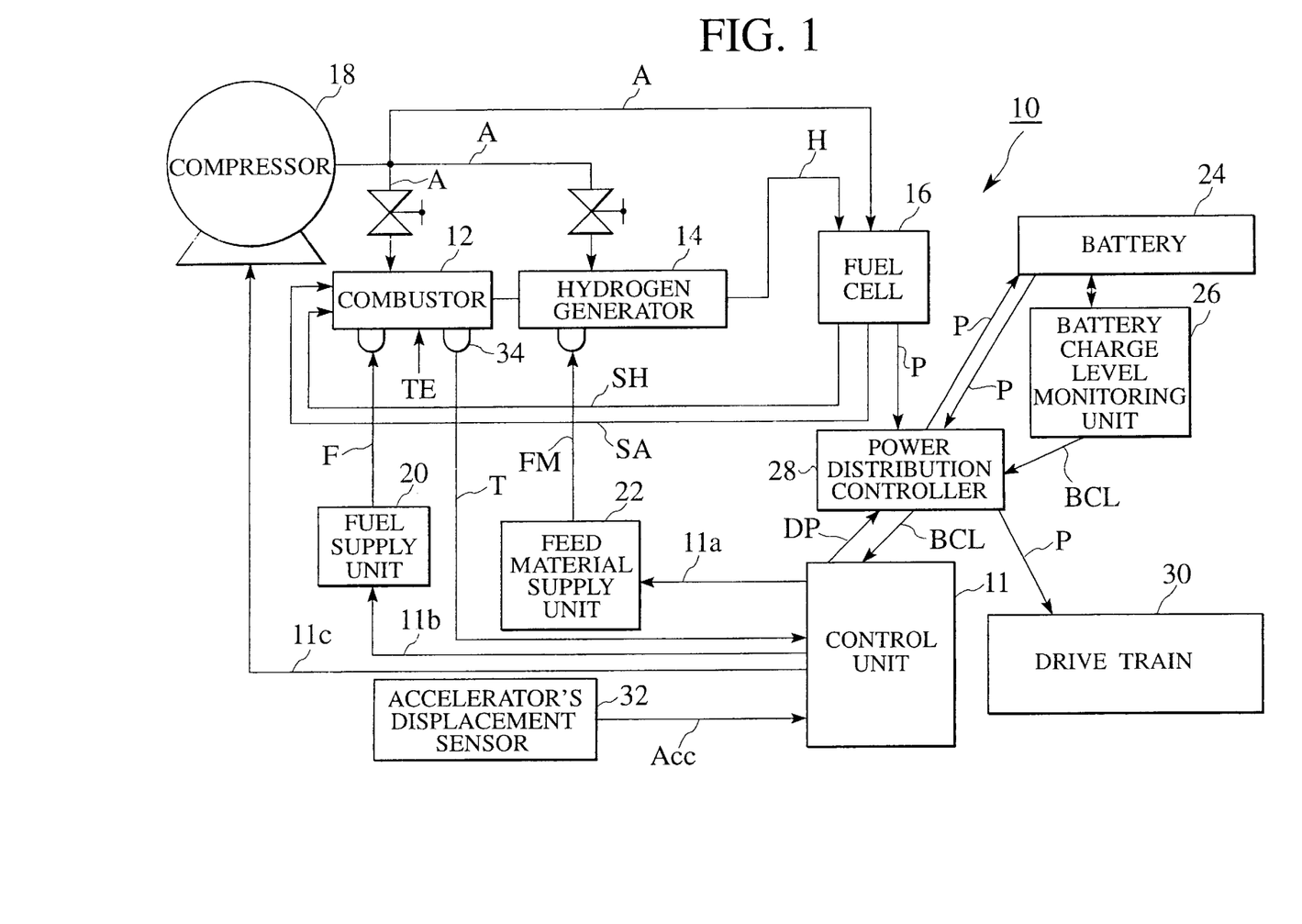
FIG. 1 is a block diagram for illustrating a preferred first embodiment of a fuel cell system according to the present invention.

FIG. 1 is a block diagram illustrating a first preferred embodiment of a fuel cell system and a controller thereof according to the present invention.

In the preferred embodiment, the fuel cell system 10 typically applied to a vehicle and includes a control unit 11 which is constructed of a microcomputer and necessary memories (not shown), a combustor 12 which combusts fuel, a hydrogen generator (reformer) 14 which reforms a feed material to produce hydrogen gas H, a fuel cell 16 which generates output power P by achieving electrochemical reaction of hydrogen and air, a compressor 18 which supplies air A to the combustor 12, the hydrogen generator 14 and the fuel cell 16, a fuel supply unit 20 which supplies fuel F to the combustor 12, a material feeding unit 22 which feeds methanol and water as feed material FM to the hydrogen generator 14, a battery 24 which preferably charges output power P generated by the fuel cell 16 and which preferably discharges output power P, a battery charge level monitoring unit 26 which monitors a charge level of the battery 24 to produce a battery charge-level signal BCL, a power distribution controller 28 which controls output power P from the fuel cell 16 and battery 24 to be distributed, a drive train 30 (an external load) which converts output power into a motive power, an accelerator's displacement sensor 32 which detects a displacement value of an accelerator such as a stroke of an accelerator's pedal (not shown) depressed by a driver or degree of a throttle valve (not shown) to catch the driver's will for acceleration, and a temperature sensor 34 which detects the temperature of the combustor 12 to produce a temperature detection signal T which is applied to the control unit 11.

The hydrogen generator 14 produces hydrogen rich gas by steam reforming methanol and water FM fed from the material feeding unit 22 and air (oxygen) A supplied from the compressor 18, with resultant hydrogen rich gas H being supplied to a fuel electrode (an anode) of the fuel cell 16 while expelling exhaust gas.

The fuel cell 16 also has an air electrode (cathode), to which air A is supplied from the compressor 18 and also hydrogen containing gas H is supplied from the hydrogen generator 14 as discussed above, with hydrogen and oxygen reacting to generate output power.

Surplus hydrogen containing gas SH and surplus air SA expelled from the fuel electrode and the air electrode, respectively, in the fuel cell 16 are recycled to the combustor 12 wherein surplus hydrogen gas SH and surplus air SA are combusted, producing combustion gas, i.e., thermal energy TE for use in steam reforming.

The control unit 11 is constructed having a RAM (not shown) which stores reference data, a ROM (not shown) which stores control programs and a CPU (not shown) which executes various calculation and computation in a manner as will be described below.

Figure 5:
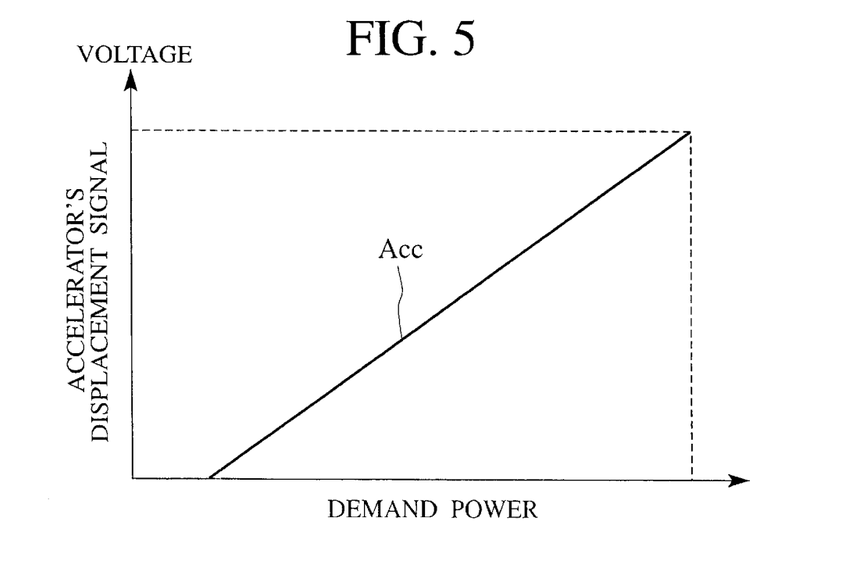
FIG. 5 is a graph for illustrating the relationship between the accelerator's displacement value and the demand power in the first preferred embodiment.

The CPU in the control unit 11 is supplied with the accelerator's displacement signal Acc delivered from the accelerator's displacement sensor 32 and, in response thereto, calculates demand power, thereby producing a demand power signal DP to send to the power distribution controller 28. The relationship between the accelerator's displacement signal Acc and demand power is shown in FIG. 5. That is, as viewed in FIG. 5, demand power varies in proportion to the magnitude of the accelerator's displacement signal Acc. Thus, demand power represents the driver's will for acceleration of the vehicle. The CPU also in response to the accelerator's displacement signal, calculates an acceleration (accelerator's displacement value per unit time) in response thereto, thereby determining a normal or low-rate acceleration, a medium-rate or slow-rate acceleration and a rapid-rate acceleration, respectively. The CPU further functions to correct demand power with a power correction pattern in response to the accelerator's displacement value per unit time and the charge level of the battery in a manner as will be discussed in detail later.

In operation, that is, in a normal operating mode, the hydrogen generator 14 is supplied with feed material FM from the material feeding unit 22 at a feed rate sufficient for allowing the fuel cell 16 to generate an electric power to be required. To this end, the control unit 11 produces a first command signal 11a which is applied to the material feeding unit 22 such that it feeds raw material FM to the hydrogen generator 14 at a suitable feed rate.

Feed material FM, which is fed to the hydrogen generator 14 from the material feeding unit 22, is reacted to produce hydrogen gas due to chemical reaction. Hydrogen gas H thus produced by the hydrogen generator 14 is supplied to the fuel electrode of the fuel cell 16, wherein the hydrogen gas H is subjected to chemical reaction with air A supplied from the compressor 18 to generate electric power output P. The control unit 11 also produces a second command signal 11b for controlling the operation of the fuel supply unit 20 and a third command signal 11c for controlling the operation of the compressor 18, both of which are operated in a manner as will be described later.

Output power P generated in the fuel cell 16 is supplied to the drive train 30 at a rate required for a normal traveling state through the power distributing controller 28.

In the mean time, hydrogen gas H and air A supplied to the fuel cell 16 are consumed therein at a reaction rate required for electric power generation, and non-reacted hydrogen gas and air are expelled from the fuel cell 16 as surplus hydrogen gas SH and surplus air SA. Surplus hydrogen SH and surplus air SA are then recycled to the combustor 12 wherein these combusts each other, producing thermal energy TE necessary for allowing the hydrogen generator 14 to produce hydrogen gas.

Figure 2:
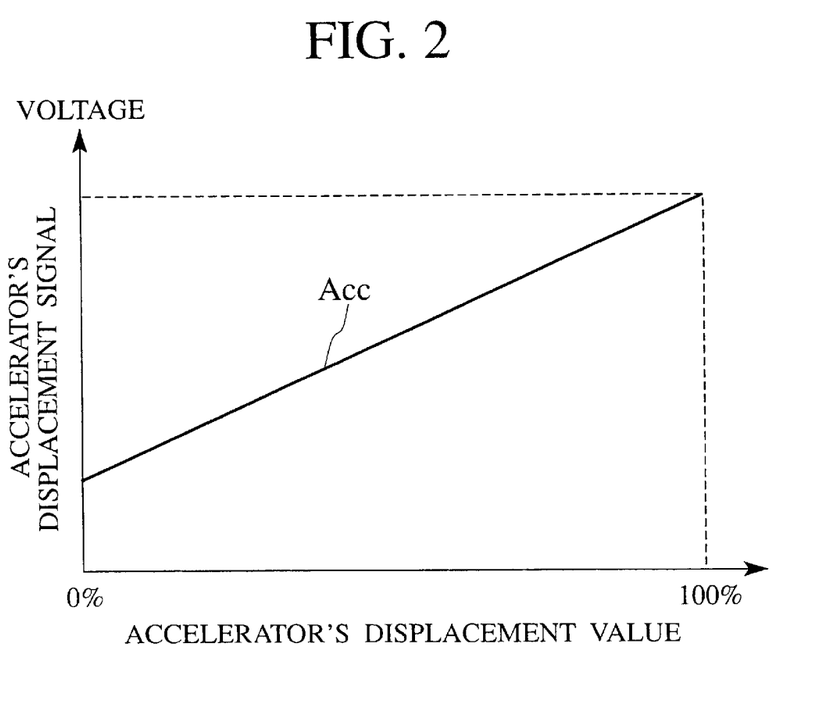
FIG. 2 is a graph for illustrating the relationship between an accelerator's displacement signal and an accelerator's displacement value in the first preferred embodiment.

On the other hand in a transient operating mode, the fuel cell system 10 operates in a manner described below. That is, as shown in FIG. 2, when the driver depresses an accelerator pedal at the time of start-up or for an acceleration during a halt or during a normal traveling state, the accelerator's displacement sensor 32 detects the driver's will for acceleration to produce an accelerator's displacement signal Acc which is delivered to the control unit 11. As viewed in the graph of FIG. 2, the accelerator's displacement signal Acc is a voltage signal which varies in proportion to the accelerator's displacement value.

The battery charge level monitoring unit 26 monitors a charge level of the battery 24 at all times and produces a battery charge-level signal BCL, which is applied through the power distribution controller 28 to the control unit 11.

Figure 3:
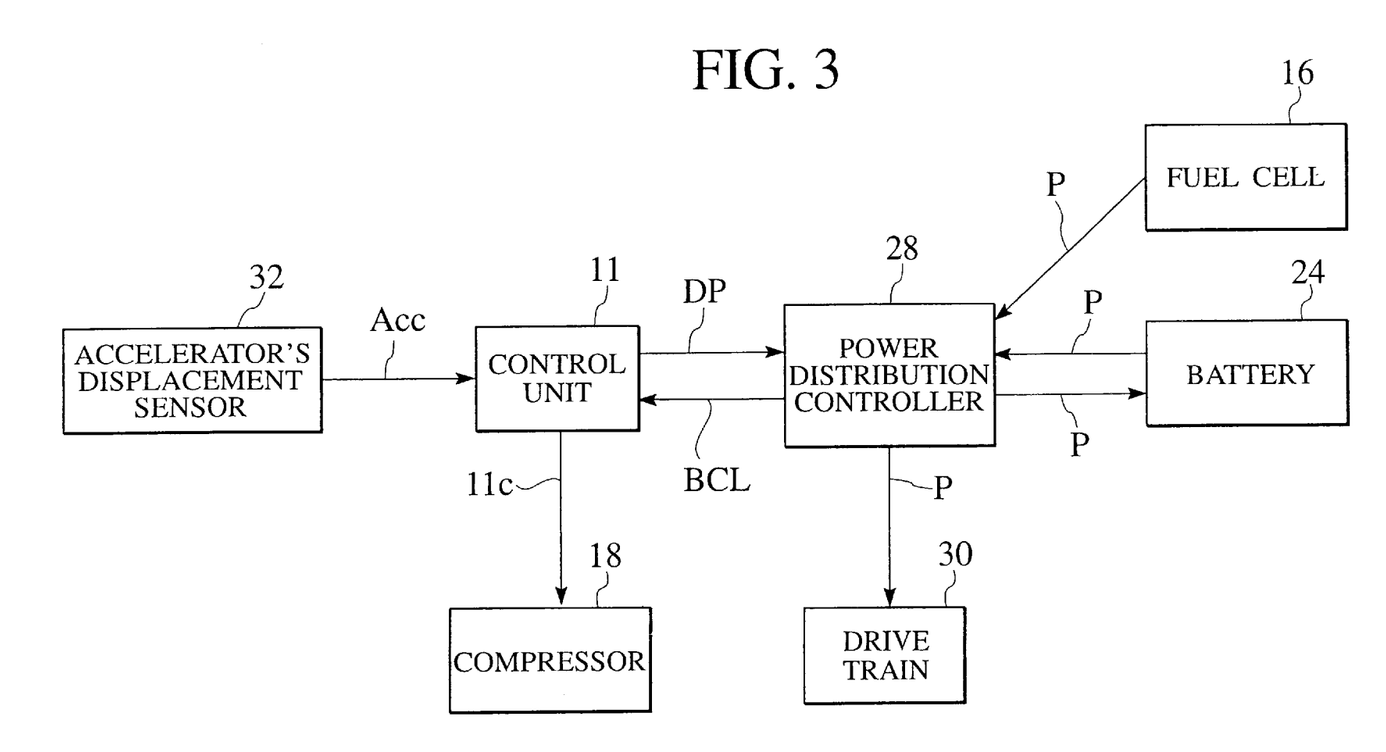
FIG. 3 is a block diagram for illustrating the operation of a power distribution controller shown in the first preferred embodiment.

As shown in a block diagram of FIG. 3 in detail, the power distribution controller 28 monitors the electric power generated in the fuel cell 16, the charge level of the battery 24 and power required by auxiliary units such as the compressor 18 at all times and distributes power output P produced by the fuel cell 16 and power output P discharged by the battery 24 to the drive train 30 at a power level required therefor.

Figure 4:
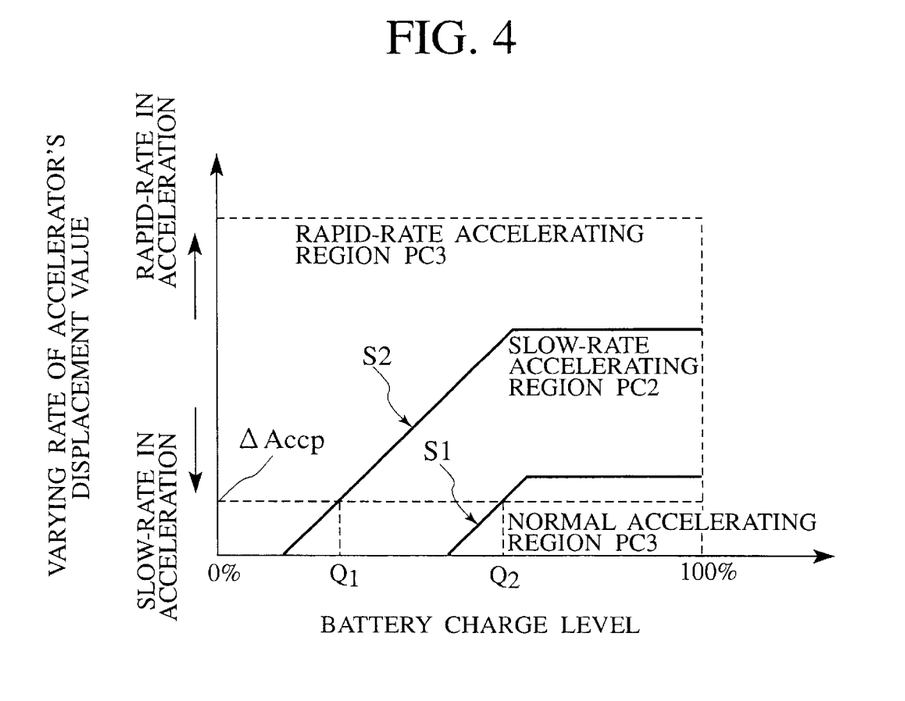
FIG. 4 is a graph for illustrating a control map to obtain demand power from the accelerator's displacement value and a battery charge level in the first preferred embodiment.

FIG. 4 shows a control map that is used by the CPU of the control unit 11 to execute correction of demand power in terms of the acceleration, i.e., the accelerator's displacement value per unit time or varying rate of accelerator's displacement value, and the charge level of the battery 24. The control map includes a power correction pattern that is determined in terms of the varying rates of the accelerator's displacement value and the charge level of the battery. As viewed in FIG. 4, the control map is composed of first, second and third power correction regions PC1, PC2 and PC3 for normal acceleration, slow-rate acceleration and rapid-rate acceleration, respectively. The first and second power correction regions PC1 and PC2 are defined with a first threshold curve S1, and the second and third power correction regions PC2 and PC3 are defined with a second threshold curve S2, with the first and second threshold curves S1 and S2 tracing threshold values which vary in a linear and oblique manner with a positive inclination. In the first power correction region PC1 for the normal acceleration, demand power is determined merely on a basic incremental value in demand power and a correcting value is not added. In the second power correction region PC2 for the slow-rate acceleration, demand power is determined to have a value wherein a first additional incremental value defined for the slow-rate acceleration is added to a basic incremental value in demand power for such a situation. In the third power correction region PC3 for the rapid-rate acceleration, demand power is determined to have a value wherein a second additional incremental value defined for the rapid-rate acceleration is added to a basic incremental value in demand power for such a situation.

More specifically, the CPU of the control unit 11 calculates the accelerator's displacement value per unit time ΔAcc by using the accelerator's displacement signal Acc in a manner as shown in the following calculating formula for convenience:

Accelerator's displacement value per unit time ΔAcc=Accelerator's displacement signal Accnew−Accelerator's displacement signal Accold (1)

wherein Accnew designates the newest accelerator's displacement value and Accold designates a preceding accelerator's displacement value detected at a timing 100 ms before the newest accelerator's displacement value.

A power correction value to be added to demand power is determined in terms of the accelerator's displacement value per unit time ΔAcc calculated from the above formula and the battery charge level by using the control map shown in FIG. 4. The power correction value to be added to demand power varies in response to the charge level of the battery 24 and the varying rate of the accelerator's displacement value, i.e., the rates of acceleration of the vehicle.

Figure 7:
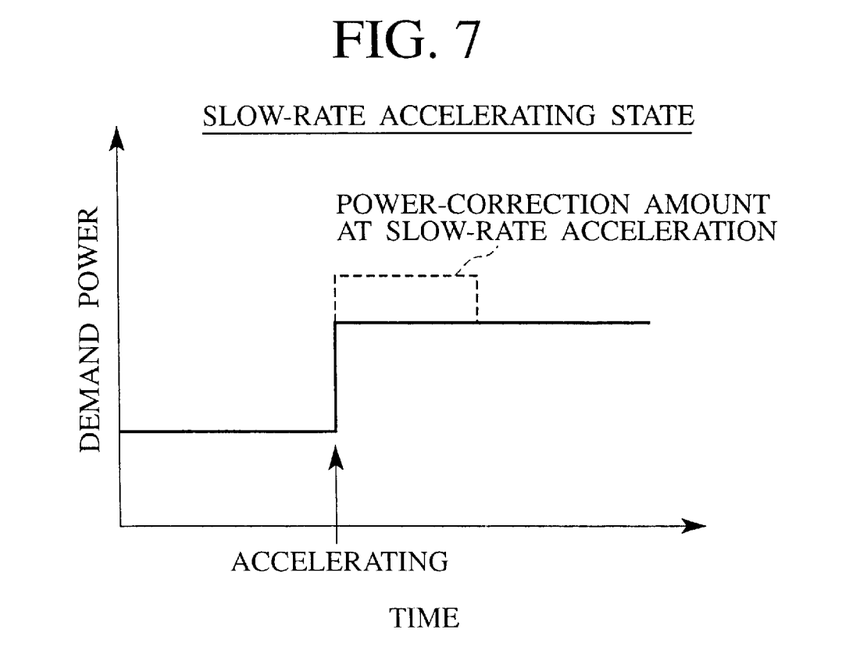
FIG. 7 is a graph for illustrating the amount of demand power plotted in terms of a slow rate of acceleration in the first preferred embodiment.
Figure 8:
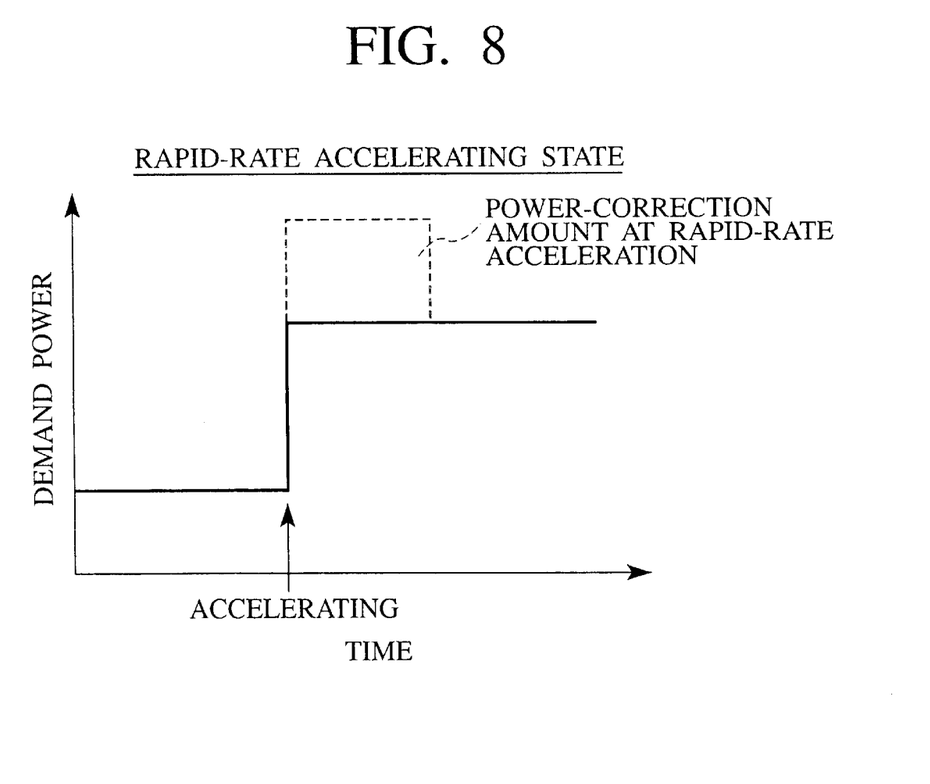
FIG. 8 is a graph for illustrating the amount of demand power plotted in terms of a rapid rate of acceleration in the first preferred embodiment.

For example in the control map shown in FIG. 4, when the battery charge level remains in a range between 0 and Q1% and varying rate of the accelerator's displacement value ΔAcc remains at ΔAccp, demand power for the rapid-rate acceleration is equal to a value wherein the second additional incremental value specified for the rapid-rate acceleration is added to the basic incremental value in demand power (see FIG. 8). Further, when the battery charge level remains in a range between Q1 and Q2% and varying rate of the accelerator's displacement value ΔAcc remains at ΔAccp, demand power for the slow-rate acceleration is equal to a value wherein the first additional incremental specified for the slow-rate acceleration is added to the basic incremental value in demand power (see FIG. 7). In addition, when the battery charge level remains in a range between Q2 and 100% and varying rate of the accelerator's displacement value ΔAcc remains at ΔAccp, demand power for normal acceleration is only based on the basic incremental value in demand power and no additional incremental value is added thereto (see FIG. 6).

Thus, in the preferred embodiment, when the charge level of the battery remains in an adequately high range, since the battery 24 is capable of providing an adequate amount of output power even when the magnitude of acceleration demand is large. In contrast, with less charge level in the battery, since the battery 24 is unable to provide an adequate output power to the external load even when the degree of acceleration demand is low, demand power is suitably increased.

In the preferred embodiment, also, as shown by the threshold curves S1 and S2 in FIG. 4, demand power varies in dependence on the battery charge level at boundaries corresponding to the linear and oblique lines (that is, corresponding to threshold values S1 and S2) between the normal accelerating state and the slow-rate accelerating state and between the slow-rate and rapid-rate accelerating states. As a result, since power correction value to be added to demand power varies analogously along respective boundary lines between the normal accelerating and slow-rate accelerating states and between the slow-rate accelerating and rapid-rate accelerating states, the vehicle is allowed to achieve smooth acceleration.

Figure 6:
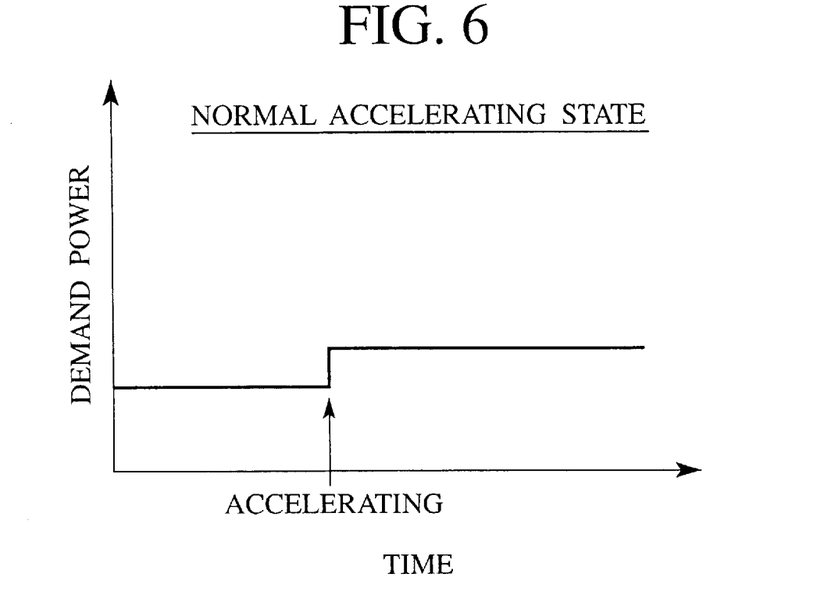
FIG. 6 is a graph for illustrating the amount of demand power plotted in terms of a normal accelerating condition in the first preferred embodiment.

Also more specifically, demand power required during acceleration to the fuel cell is determined such that demand power calculated in response to the accelerator's displacement value Acc shown in FIG. 5 is added with a power correction value derived from the varying rate of accelerator's displacement value ΔAcc and the battery charge level and which is expressed as:

Demand power at acceleration=(demand power depending on the accelerator's displacement value)+(demand power depending on the accelerator's displacement value×power correction value determined for acceleration) (2)

with this calculation, demand power is derived for the normal accelerating state, the slow-rate accelerating state and the rapid-rate accelerating state in a manner as shown in FIGS. 6 to 8.

FIG. 6 shows a graph for illustrating demand power in terms of the battery charge level for the normal accelerating state, wherein since the accelerator's displacement value remains at low level, no power correction is implemented to demand power during acceleration. Further, FIG. 7 shows a graph for illustrating demand power in terms of the slow-rate accelerating state, wherein the basic incremental value in demand power during the slow-rate acceleration is added with the additional incremental value specified for the slow-rate acceleration. Also, FIG. 8 shows a graph for illustrating demand power in terms of the battery charge level for the rapid-rate accelerating state, wherein the basic incremental value in demand is added with the additional incremental value specified for the rapid-rate accelerating state.

Thus, when the battery charge level remains inadequate, although it is unable for the battery 24 to supply a part of power output required for acceleration, the fuel cell system of the preferred embodiment allows transient demand power to be corrected with the accelerating power correction factor (see FIG. 8) only during acceleration, thereby producing an adequate amount of demand power as to the fuel cell without causing a shortage in output power for thereby meeting an accelerating performance.

On the contrary, in the preferred embodiment, when the battery 24 remains at an adequate charge level, since the battery 24 enables to supply a part of the power output necessary for acceleration, transient power output required for acceleration decreases even when the accelerator's displacement value has the same values that discussed above, preventing a decrease in consumption of the feed material and undesirable influence to the combustor 12.

Figure 9:
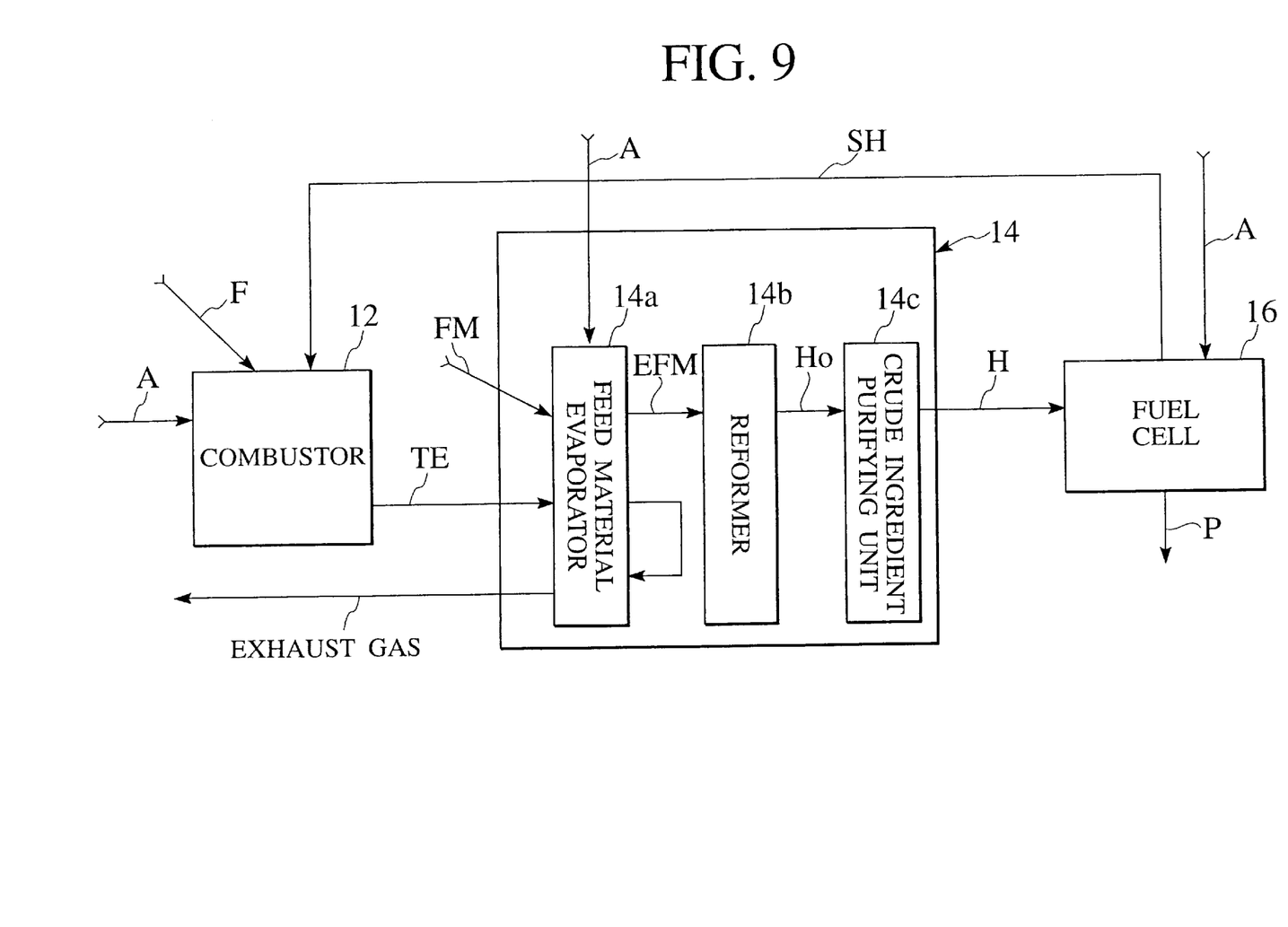
FIG. 9 is a block diagram of a second preferred embodiment of a fuel cell system according to the present invention.

FIG. 9 shows a block diagram of a second preferred embodiment of a fuel cell system according the present invention, with like parts bearing the same reference numerals as those used in FIG. 1 and detailed description of the like parts being herein omitted for the sake of clarity except the hydrogen generator 14.

In the second preferred embodiment shown in FIG. 9, the hydrogen generator 14 is constructed having a feed material evaporator 14a, a reformer 14b and a crude ingredient purifying unit 14c.

The feed material evaporator 14a includes a heat exchanger which is supplied with feed material FM, containing methanol and water, from the feed material feeding unit 22 and which evaporates feed material in heat exchange with the thermal energy TE fed from the combustor 12, producing evaporated feed material EFM such as evaporated methanol and water.

The reformer 14b includes a reactor which functions to achieve steam reforming of evaporated methanol, steam and air fed from the compressor 18, producing crude hydrogen rich gas Ho.

Since hydrogen rich gas Ho contains carbon monoxide, as toxic ingredient, which deteriorates a catalytic material of the fuel cell 16, carbon monoxide is removed from the crude ingredient purifying unit 14c, producing hydrogen rich gas H with no carbon monoxide.

As shown in FIG. 9, although hydrogen gas H supplied to the fuel cell 16 is chemically reacted with air A and consumed for producing electric power output P, with non-reacted surplus hydrogen gas SH being recycled, as already descrived in the first preferred embodiment, to the combustor 12 for combustion and utilized as thermal energy for evaporating feed material in the feed material evaporator 14a in the hydrogen generator 14.

Figure 10:
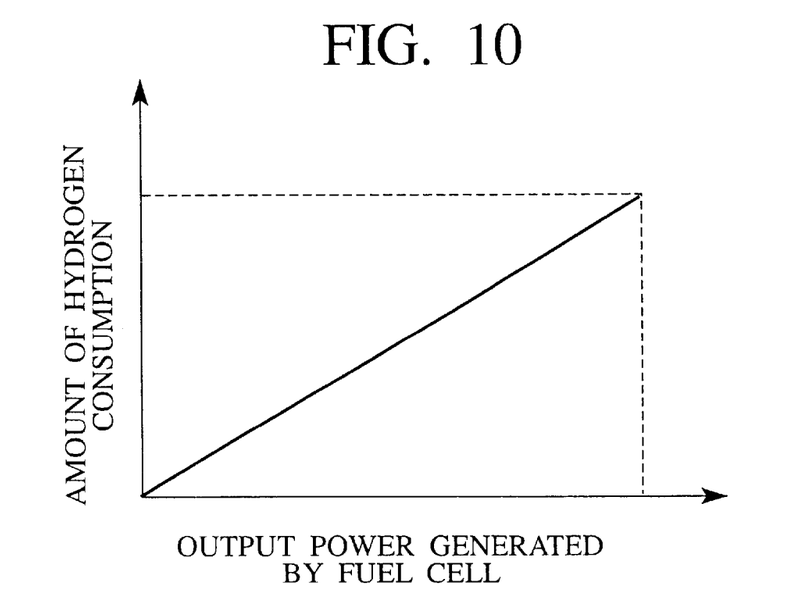
FIG. 10 is a graph for illustrating the relationship between electric power output generated by the fuel cell and the amount of hydrogen consumption therein in the second preferred embodiment.
Figure 11:
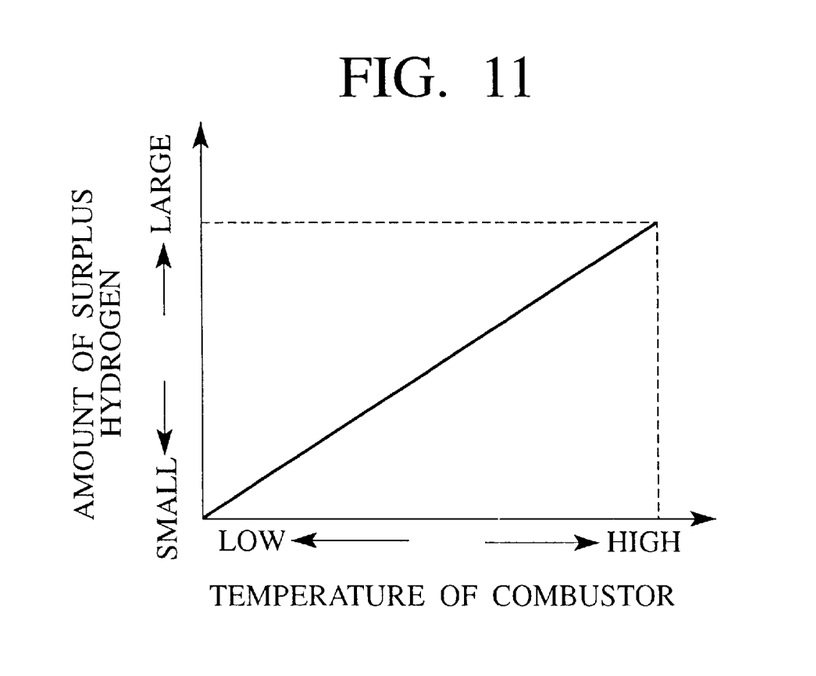
FIG. 11 is a graph for illustrating the relationship between the amount of surplus hydrogen and the temperature of a combustor in the second preferred embodiment.

By the way, as viewed in FIG. 10, as the amount of electric power output generated by the fuel cell 16 increases, the amount of consumption of hydrogen gas chemically reacted in the fuel cell 16 also increases. As shown in FIG. 11, also, as surplus hydrogen gas expelled from the fuel cell 16 decreases, the temperature of the combustor 12 also decreases. In particular, during the rapid-rate accelerating condition, the amount of power output increases, with a resultant remarkable decrease in the amount of hydrogen gas.

For this reason, in the second preferred embodiment, demand power is increased during the rapid-rate acceleration in the same manner as in the first preferred embodiment and also fuel F is supplied to the combustor 12 from the fuel supply unit 20 at an increased flow rate to prevent the combustor 12 from being lowered in temperature. With this control, the combustor 12 is capable of supplying thermal energy, required for generation of hydrogen gas, to the hydrogen generator 14 in a continuous manner, enhancing efficient generation of hydrogen gas with a resultant continuous and stable generation of electric power output.

In this event, the acceleration of the vehicle can be discriminated in terms of the varying rate of the accelerator's displacement value ΔAcc with the control map shown FIG. 4, and thus the control map shown FIG. 4 can be simply used to increase the fuel F.

Figure 12:
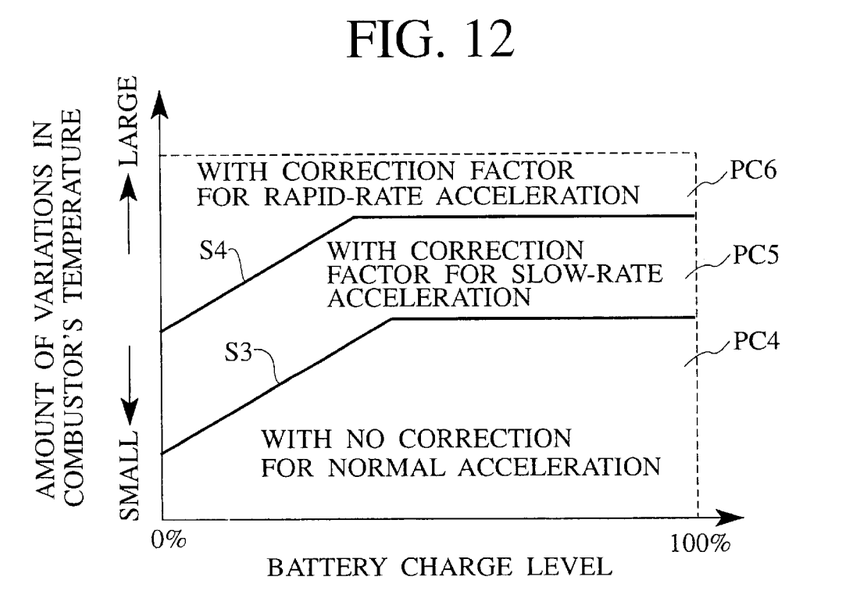
FIG. 12 is a graph for illustrating a control map to obtain a required amount of fuel correction from variation in the temperature of the combustor in the second preferred embodiment.

Besides, the temperature sensor 34 is mounted on the combustor 12 (or in a combustion gas flow passage) to produce a temperature signal T, and the accelerating power correction value to be combined with demand power may be determined by using a control map, shown in FIG. 12, which includes first, second and third correction regions PC4, PC5 and PC6 with threshold curves S3 and S4 that are determined in terms the amount of variation in the temperature of the combustor 12 and the charge level of the battery 24 respectively for normal acceleration, slow-rate acceleration and rapid-rate acceleration. In the first region PC4, a correction value is not added to a flow rate of fuel F to be based, in the second region PC5, a correction value for a slow-rate acceleration is added to a flow rate of fuel F to be based, and in the third region PC6, a correction value for a rapid-rate acceleration is added to a flow rate of fuel F to be based, respectively.

In this event, furthermore, since a decrease in the amount of surplus hydrogen gas results in a lowered temperature of the combustor 12, the decrease in the temperature of the combustor 12 is monitored with the temperature sensor 34 mounted to the combustor 12, thereby making it possible to calculate the amount of increase in the temperature necessary for increasing the flow rate of fuel F supplied to the combustor 12 from the fuel supply unit 20 and, in proportion thereto, for increasing the flow rate of air A to be supplied to the combustor 12 from the compressor 18.

While the fuel cell systems of the first and second preferred embodiments have been described, the fuel cell systems of the present invention may further be modified in a manner described below.

Figure 13:
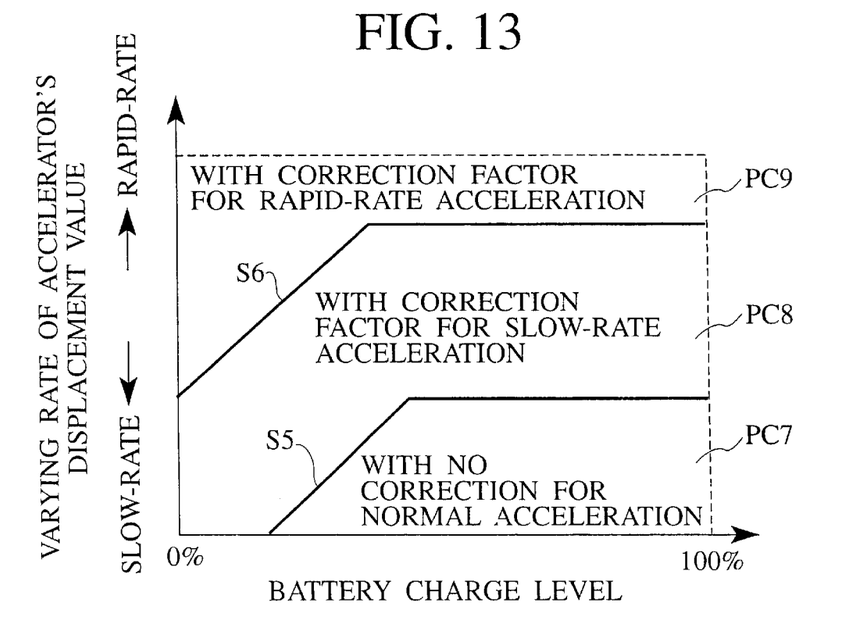
FIG. 13 is a graph for illustrating a control map to obtain the amount of fuel correction in terms of the values different from those in FIG. 4 in an another modified embodiment of the present invention.

For example, in the first preferred embodiment, although the correction of demand power has been discussed as being determined by using the control map shown in FIG. 4 in terms of the charge level of the battery 24 and the varying rate of accelerator's displacement value, control of the flow rate of fuel to be supplied to the combustor 12 may be implemented by using a control map which has threshold values such as FIG. 13 different from those used in FIG. 4. FIG. 13 is a graph for illustrating this typical example, wherein since the correction factor to be implemented in the flow rate of fuel to prevent temperature drop in the combustor 12 is not unitarily determined in terms of the rate of acceleration, each of threshold curves S5 and S6 is desirably preset to a predetermined value independently of the increase in demand power. In FIG. 13, more specifically, the control map includes first, second and third correction regions PC7, PC8 and PC9 with the different threshold curves S5 and S6 that are determined in terms of the varying rate of the accelerator's displacement value and the charge level of the battery.

By using such a control map having the threshold values different from those shown in FIG. 4, it is possible for the rate of flow of fuel to be controlled in a desirable manner without either abnormal temperature rise in the combustor 12, caused by excessive increase in fuel, or situation in which the temperature is not increased because of a lack in increase in the flow rate of fuel.

Figure 14:
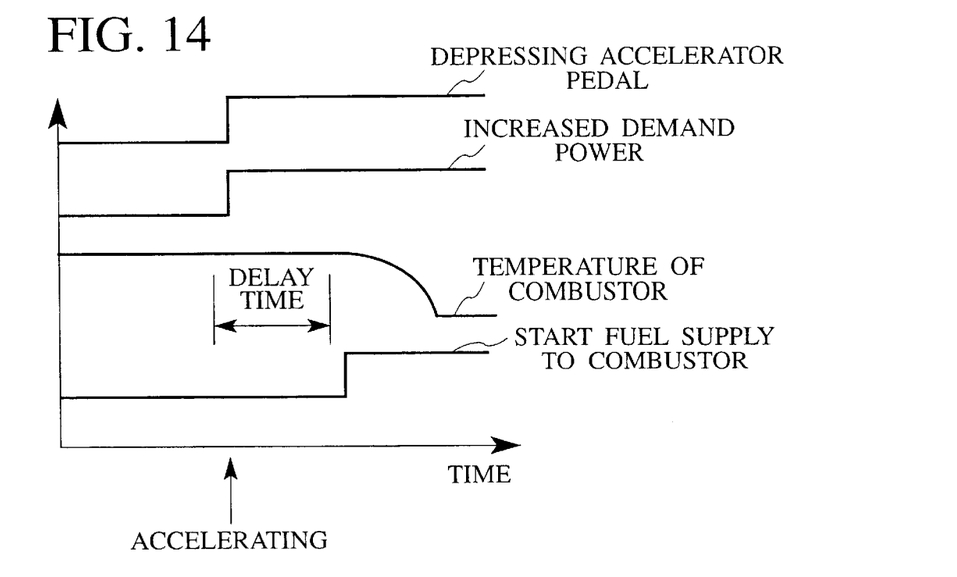
FIG. 14 is a graph for illustrating how the temperature of the combustor is decreased at a delayed time, in an another modified embodiment of the present invention.

In the preferred embodiments discussed above, also, fuel is supplied from the fuel supply unit 20 to the combustor 12 with a view to increasing demand power during the rapid-rate acceleration and preventing the temperature drop in the combustor 12. In this event, as shown in FIG. 14, when the response in the temperature drop in the combustor 12 is later than the rate of increase in demand power, fuel may be supplied to the combustor 12 at a delayed time relative to the rate of increase in demand power. With such a control, it is possible to avoid the abnormal temperature rise in the combustor 12 or the situation in which the temperature is not increased.

Figure 15:
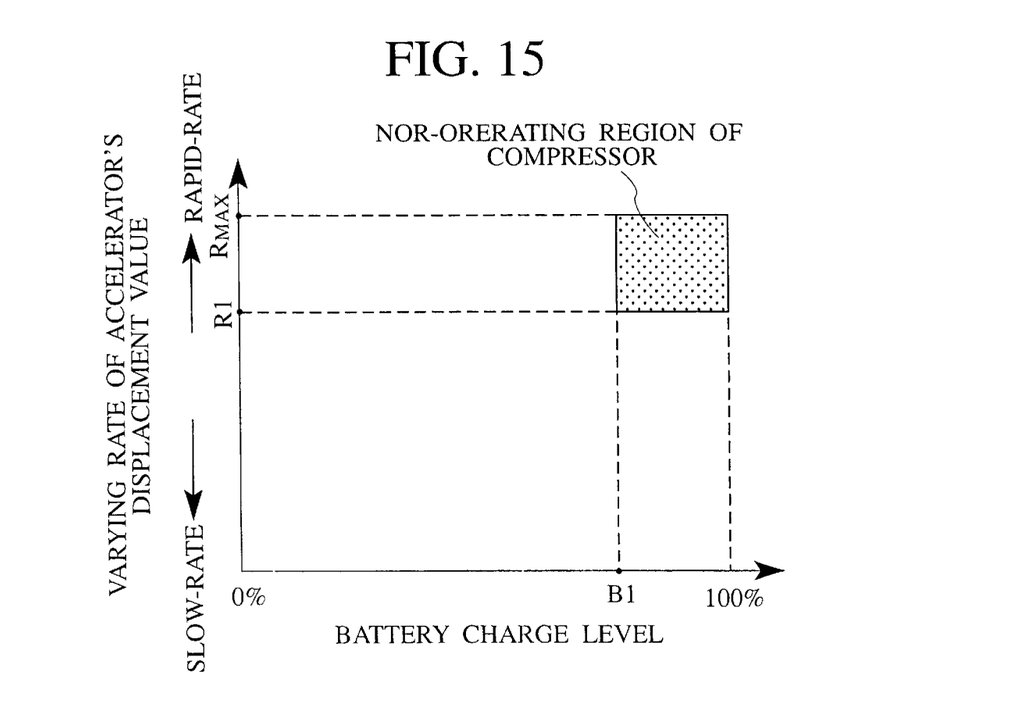
FIG. 15 is a graph for illustrating an inoperative region of a compressor in an another modified embodiment of the present invention.

As shown in FIG. 15, furthermore, in a region where the charge level of the battery 24 is beyond B1 and the vehicle remains at the rapid-rate accelerating state beyond R1, although rapid-rate acceleration is required, the presence of a high charge level of the battery 24 allows for the vehicle to achieve acceleration without the need for power output of the fuel cell system 10. That is, in this event, since a high priority is given to power output of the battery 24 to be supplied to the drive train 30, the compressor 18 does not need to supply air to the fuel cell system 10 and, thus, it is desirable to momentarily interrupt the operation of the compressor 18.

In the present invention, the presence of control in demand power during acceleration in response to a battery charge level allows demand power as to a fuel cell to be settled to an adequately high level necessary for achieving a comfortable accelerating performance even in a slow-rate of acceleration at a low charge level of a battery.

In the event the battery remains at a high charge level, the demand power is not inordinately to increase, resulting in a reduction in surplus hydrogen gas that would otherwise cause an excessively high temperature rise in the combustor.

By supplying surplus hydrogen gas recovered from the fuel cell and air to the combustor, the temperature of the combustor is increased. Further in this event, the flow rates of fuel and air to the combustor are increased, depending on accelerating correction factors to be added to demand power, allowing the combustor to produce a thermal energy in an efficient manner for enhancing reliable generation of hydrogen to permit the fuel cell to generate electric power in a stable manner.

Besides in this event, determination of the flow rates of fuel and air to the combustor in terms of the operating temperature of the combustor and the charge level of the battery allows the combustor to be supplied with fuel at a suitable flow rate throughout whole operating conditions of the fuel cell system without an abnormal temperature rise caused by supply of fuel at an excessively increased flow rate or an undesirable situation wherein the temperature of the combustor can not be increased.

Further, supply of fuel to the combustor at a delayed time relative to an increase in demand power allows the supply of fuel to the combustor to be initiated at a time instant suitable for effectively preventing the abnormal temperature rise in the combustor and the situation wherein the temperature of the combustor is not increased.

Still further, in the event the vehicle is subjected to the rapid-rate acceleration under a state wherein the battery remains at a high charge level, the compressor is temporarily interrupted in operation for temporarily interrupting the operation of the fuel cell while allowing the battery to discharge electric power to the electric drive train to achieve a enough accelerating performance.

The entire content of a Patent Application No. TOKUGAN 2000-159594 with a filing date of May 30, 2000 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system comprising:
    a fuel cell producing output power;
    a battery discharging output power;
    a battery charge level monitoring unit monitoring and detecting a charge level of the battery;
    an accelerator's displacement sensor detecting an accelerator's displacement value; and
    a controller calculating demand power to be produced by the fuel cell based on the accelerator's displacement value detected by the accelerator's displacement sensor, calculating an accelerator's displacement value per unit time based on the accelerator's displacement value, and correcting the demand power based on the accelerator's displacement value per unit time and the charge level of the battery detected by the battery charge level monitoring unit.

2. A fuel cell system according to claim 1, wherein the controller corrects to increase the demand power.

3. A fuel cell system according to claim 1, further comprising:
    a combustor combusting fuel to produce thermal energy; and
    a hydrogen generator supplied with the thermal energy and producing hydrogen gas to be supplied to the fuel cell;
    and wherein surplus hydrogen gas expelled from the fuel cell is recycled to the combustor for combustion therein, and the controller controls temperature of the combustor based on the accelerator's displacement value per unit time and the charge level of the battery.

4. A fuel cell system according to claim 3, further comprising a fuel supply unit supplying fuel to the combustor, and wherein the controller controls amount of the fuel supplied to the combustor based on the accelerator's displacement value per unit time and the charge level of the battery.

5. A fuel cell system according to claim 4, further comprising a compressor supplying air to the combustor, and wherein the controller controls amount of the air supplied to the combustor based on the accelerator's displacement value per unit time and the charge level of the battery.

6. A fuel cell system according to claim 5, wherein the controller controls to supply the fuel and the air to the combustor at a predetermined delayed time after the demand power is corrected.

7. A fuel cell system according to claim 5, wherein when the accelerator's displacement value per unit time exceeds a predetermined value and the charge level of the battery exceeds a predetermined value, the controller interrupts the operation of the compressor.

8. A fuel cell system according to claim 1, further comprising:
a combustor combusting fuel to produce thermal energy;
a hydrogen generator supplied with the thermal energy and producing hydrogen gas to be supplied to the fuel cell; and
a temperature sensor detecting temperature of the combustor,
and wherein surplus hydrogen gas expelled from the fuel cell is recycled to the combustor for combustion therein, and the controller controls temperature of the combustor based on the temperature of the combustor detected by the temperature sensor and the charge level of the battery.

9. A fuel cell system according to claim 8, further comprising a fuel supply unit supplying fuel to the combustor, and wherein the controller controls amount of the fuel supplied to the combustor based on the temperature of the combustor and the charge level of the battery.

10. A fuel cell system according to claim 9, further comprising a compressor supplying air to the combustor, and wherein the controller controls amount of the air supplied to the combustor based on the temperature of the combustor and the charge level of the battery.

11. A fuel cell system according to claim 10, wherein the controller controls to supply the fuel and the air to the combustor at a predetermined delayed time after the demand power is corrected.

12. A fuel cell system according to claim 10, wherein when the accelerator's displacement value per unit time exceeds a predetermined value and the charge level of the battery exceeds a predetermined value, the controller interrupts the operation of the compressor.

13. A fuel cell system according to claim 1, wherein the controller corrects the demand power by using a control map including a power correction pattern determined in terms of the accelerator's displacement value per unit time and the charge level of the battery.

14. A fuel cell system according to claim 13, wherein the power correction pattern has a threshold value linearly changing in response to the charge level of the battery.

15. A fuel cell system according to claim 3, wherein the controller controls the temperature of the combustor by using a control map including a power correction pattern determined in terms of the accelerator's displacement value per unit time and the charge level of the battery.

16. A fuel cell system according to claim 15, wherein the power correction pattern has a threshold value linearly changing in response to the charge level of the battery.

17. A fuel cell system according to claim 3, wherein the controller controls the temperature of the combustor by using a control map including a power correction pattern determined in terms of the temperature of the combustor and the charge level of the battery.

18. A fuel cell system according to claim 17, wherein the power correction pattern has a threshold value linearly changing in response to the charge level of the battery.

19. A controller of a fuel cell system provided with a fuel cell producing output power and a battery discharging output power, the controller comprising:
means for monitoring and detecting a charge level of the battery;
means for detecting an accelerator's displacement value;
means for calculating demand power to be produced by the fuel cell based on the accelerator's displacement value;
means for calculating an accelerator's displacement value per unit time based on the accelerator's displacement value; and
means for correcting the demand power based on the accelerator's displacement value per unit time and the charge level of the battery.

20. A method of controlling a fuel cell system provided with a fuel cell producing output power and a battery discharging output power, the method comprising:
monitoring and detecting a charge level of the battery;
detecting an accelerator's displacement value;
calculating demand power to be produced by the fuel cell based on the accelerator's displacement value;
calculating an accelerator's displacement value per unit time based on the accelerator's displacement value; and
correcting the demand power based on the accelerator's displacement value per unit time and the charge level of the battery.

* * * * *